United States Patent [19]
Dower

[11] 3,785,346
[45] Jan. 15, 1974

[54] STALLS FOR ANIMALS AND GATE ASSEMBLIES THEREFOR

[76] Inventor: James Dower, Kiladangan Dungarvan, Ireland

[22] Filed: Aug. 22, 1972

[21] Appl. No.: 282,685

[52] U.S. Cl. ............................................. 119/27
[51] Int. Cl. ........................................... A01k 29/00
[58] Field of Search ............................... 119/27, 50

[56] References Cited
UNITED STATES PATENTS

| 2,105,879 | 1/1938 | DeHart | 119/50 |
| 2,260,028 | 10/1941 | Houston | 119/50 |
| 579,484 | 3/1897 | Jarrett | 119/27 |

Primary Examiner—Hugh R. Chamblee
Attorney—Sidney G. Faber et al.

[57] ABSTRACT

A gate assembly for fitting to a stall for animals, comprises inner and outer barrier elements which are movably mounted one behind the other at the entrance to the stall. Each barrier element is movable between an operative position in which it bars the entrance to the stall and an inoperative displaced position, and the operation of the barrier elements is so inter-related that one of the barrier elements is in the position in which it bars the entrance, when the other is in the inoperative position and vice-versa.

7 Claims, 4 Drawing Figures

PATENTED JAN 15 1974

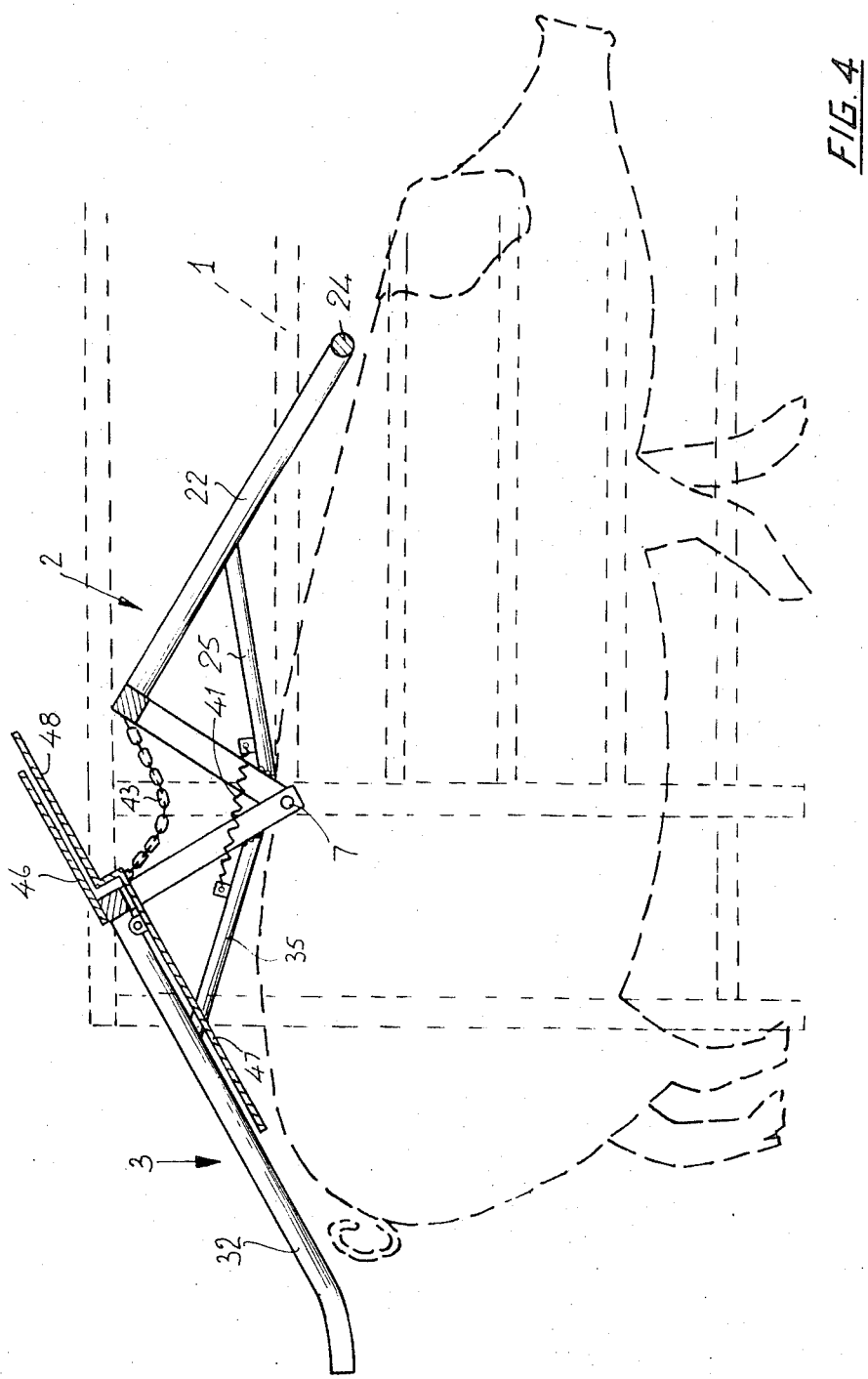

STALLS FOR ANIMALS AND GATE ASSEMBLIES THEREFOR

This invention relates to stalls for animals, and more particularly to a gate assembly for an animal stall.

It is found that when animals, and in particular sows, are being driven into stalls intended for individual animals, there is a tendency for the animals to try to follow one another into the same stall. The result of an animal trying to force its way into a relatively narrow stall which is already occupied by another, is to cause great distress to the first occupant of the stall.

It is therefore an object of this invention to provide a gate assembly for fitting to an animal stall, which will allow one animal to pass into the stall but which will then act to prevent a further animal entering the stall.

A further and more general object of the invention is to provide a gate assembly for an animal stall which will be convenient to operate in use.

According to the invention, there is provided a gate assembly comprising inner and outer barrier elements adapted to be mounted one behind the other at the entrance to a stall, so that each barrier element is movable between an operative position in which it extends in the entrance to the stall and an inoperative displaced position, the operation of the barrier elements being so inter-related that one of the barrier elements is in the operative position when the other is in the inoperative position and vice versa.

The arrangement may be such that when the inner barrier element is in its operative position it is normally free to be displaced by an animal attempting to enter the stall, so as to admit the animal to the stall, while means are provided to prevent the outer barrier element, when in its operative position, from being displaced by a second animal attempting to enter the stall, so that it bars the way to the second animal.

Preferably the barrier elements are mounted so as to be pivotable between their operative and inoperative positions. Moreover, the axis of pivoting movement of each barrier element may be horizontal, and the barrier elements may conveniently be arranged for pivoting movement about a common horizontal axis.

The invention will now be described more fully with reference to the accompanying drawings which show one form of gate for an animal stall. In the drawings:

FIG. 4 is a view from a viewpoint corresponding to FIGS. 2 and 3, but showing the position which the parts of the gate assembly take up, as an animal enters the stall; certain parts are again omitted.

Figure 2:
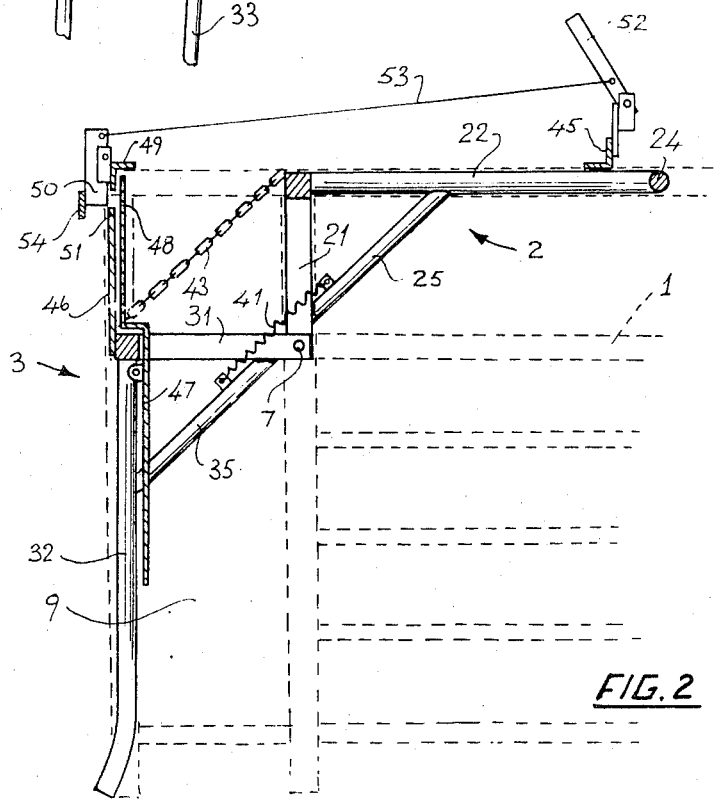
FIG. 2 is a sectional view on the median plane of the assembly, in the direction of the arrows A—A in FIG. 1, showing the assembly mounted in the entrance to a stall, and in its "closed" position.
Figure 3:
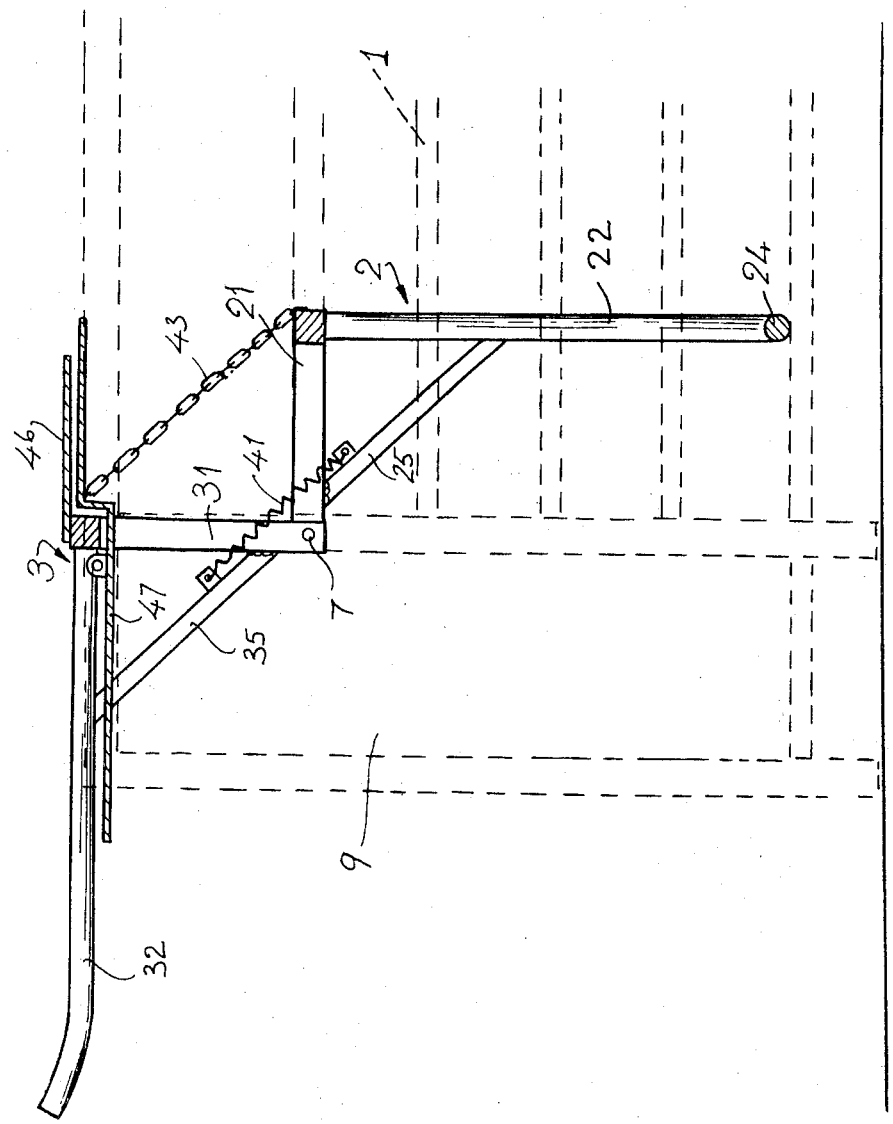
FIG. 3 is a view from a viewpoint corresponding to FIG. 2, but showing the gate assembly in its "open" position; for simplicity, certain ancillary parts shown in FIG. 2 are omitted.

Referring to the drawings, and more particularly to FIGS. 2 and 3, these figures show the gate assembly fitted at the entrance to a narrow stall, the walls of which are at such a distance apart as will allow a sow to walk forwardly into the stall and reverse out. The walls are constructed of tubular steel, the position of one wall being indicated in dotted lines at 1 in FIGS. 2 and 3.

The gate assembly comprises two barrier elements 2 and 3 made partly from tubular steel and partly from flat steel strip. Each barrier 2 or 3 includes a frame-portion 21 or 31 of steel strip, by means of which the barrier is pivotally mounted for turning movement relatively to a horizontal axis common to the two barriers 2 and 3. For this purpose the two frame portions 21,31 are pivoted together by means of pivots 7 and 8 and, when the gate assembly is mounted at the entrance to the stall, the pivots 7 and 8 define the common pivotal axis of the barriers 2 and 3, this axis extending across the upper part of the entrance 9 of the stall.

Each barrier 2 or 3 comprises two tubular limbs 22, 23 or 32, 33 welded to the frame 21 or 31 so as to extend substantially at right angles to the plane of the frame, thus forming the barrier proper. In the case of the barrier 2 (referred to herein as the "inner" barrier) the ends of the limbs 22, 23 further from the frame 21 are connected by a corss-piece 24, while the corresponding ends of the limbs 32, 33 of the barrier 3 (referred to herein as the "outer" barrier) are merely slightly curved outwardly as shown in the drawings.

In order to ensure rigidity, the limbs 22, 23 of the barrier 2 are connected to the frame 21 by means of struts 25, 26 and the limbs 32, 33 of the barrier 3 are connected to the frame 31 by means of struts 35, 36.

When either barrier is in its operative position, the frame-portion 21 or 31 thereof projects substantially horizontally from the axis of the pivots 7,8 and the two limbs 22,23 or 32, 33 depend vertically so as to bar the entrance to the stall.

Figure 1:
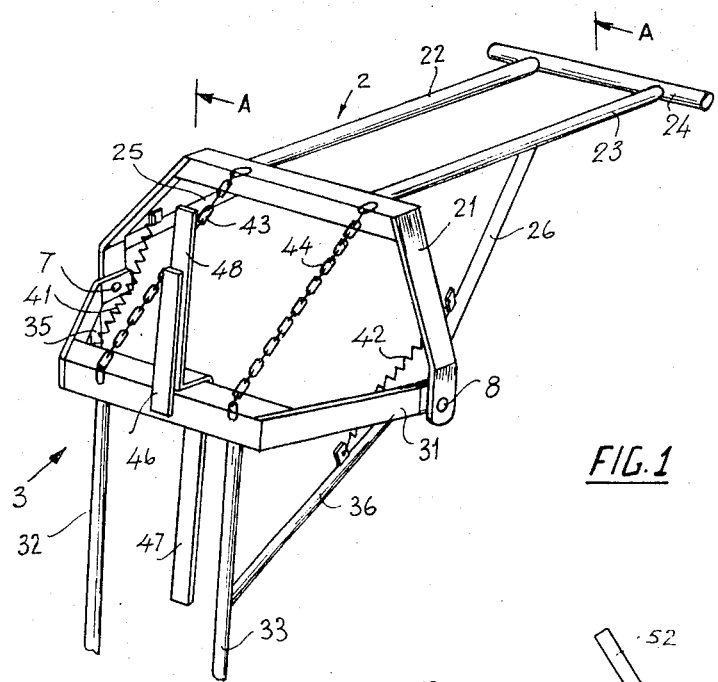
FIG. 1 is a perspective view of the gate assembly.

This position of the barrier 2 is indicated in FIG. 3, which shows the "open" position of the device, and in this position the other barrier 3 has its limbs 31, 32 extending substantially horizontally outwards relatively to the stall entrance. When the device is in the "closed" position shown in FIGS. 1 and 2, the limbs 31, 32 of the barrier 3 depend vertically and the limbs 21, 22 of the barrier 2 project horizontally inwardly relatively to the stall. This complementary arrangement of the barriers 2 and 3 is achieved by means of two springs 41, 42 connected between the pairs of struts 25, 35 and 26,36 and two connecting chains 43,44 connected between the frames 21,31 of the respective barriers.

When the device is in the "open" position shown in FIG. 3, in order to enter the stall, an animal pushes against the depending limbs 22,23 of the inner barrier 2 and/or against the cross-piece 24, so that the barrier is deflected inwardly, the cross-piece 24 meanwhile sliding over the shoulders and back of the animal as shown in FIG. 4. By virtue of the resilient interconnection between the two barriers, provided by the springs 41, 42, the outer barrier 3 now begins to pivot downwardly towards the position in which its limbs are vertical. The limbs 32,33 thus engage the animal's back, and pivot towards their vertical positions in the entrance to the stall, as they are allowed to do so by forward movement of the animal into the stall, until eventually they reach the depending vertical positions shown in FIGS. 1 and 2 in which they bar the entrance to the stall.

When the barriers 2 and 3 are in the relative positions shown in FIG. 4, the springs 41,42 are under tension, but the connecting chains 43,44 are slack. However, as the barrier 3 moves into the position in which its limbs 32,33 are vertical, the chains 43,44 tighten and the barrier 2 is drawn, under the action of the weight of the barrier 3, into the position shown in FIG. 2, in which the limbs 22,23 are horizontal. The upward pivoting movement of the limbs 22,23 is limited by the engagement thereof with a fixed stop-member 45 (FIG. 2) constituted by a length of angle-iron secured in a position extending across the upper part of the stall. Further pivoting movement of the outer barrier 3 in the inward direction relatively to the entrance of the stall is now prevented by the tautened chains 43,44. Thus if a second animal now tries to enter the stall, this is effectively prevented. On the other hand, normally the outer barrier 3 is free to swing outwards (except as described below), so that if the first animal wishes to emerge from the stall, it is free to push the outer barrier 3 outwards.

Two lengths of steel strip 46 and 47 are welded to the frame 31 of the barrier 3. As can be seen in FIG. 2, the strip or bar 47 is cranked in such a way that its upper end 48 is engaged with and disengaged from a fixed stop-member 49 formed by a length of angle-iron, during pivoting movement of the barrier 3. It will be noted that when the end 48 of the bar 47 is engaged with the stop 49 in the manner shown in FIG. 2, the stop 49 serves as a further safeguard against the barrier 3 being pushed inwards by a further animal trying to enter the stall. On the other hand, the bar 47 does not normally prevent the barrier 3 being pushed outwardly by an animal in the stall attempting to emerge.

However, a spring-catch or gravity-catch 50 is provided which can be set, when desired, to engage automatically with the end 51 of the strip or bar 46 when the outer barrier 3 reaches the position in which it bars the entrance to the stall. In this case, outward movement of the outer barrier 3 is prevented and the animal is retained in the stall until the catch is released so as to free the outer barrier for outward movement. Release of the catch 50 is effected by means of a lever 52, which can conveniently be mounted on the stop-member 45, and which is connected to the catch 50 by means of a cord 53.

If the outer barrier 3 is, in fact, free for outward movement, then as an animal pushes the limbs 32,33 thereof outwards, the barrier 3 pivots back towards its inoperative position. The inner barrier 2 then commences to move downwardly under the tension in the springs 41,42, so that the barriers 2 and 3 are again in somewhat the relative positions shown in FIG. 4. As the barrier 2 moves into the position in which its limbs 22,23 are vertical, the chains 43,44 tighten, and the barrier 3 is then drawn, under the action of the weight of the barrier 2, into the position shown in FIG. 3, in which its limbs 32,33 extend substantially horizontally outwards. Further pivoting movement of the barrier 3 is limited by engagement with a fixed stop-member 54 (shown only in FIG. 2). Meanwhile the inner barrier 2 reaches its closed position, in which its limbs 22,23 depend vertically in the entrance to the stall.

Referring again to the movement of the barrier 3 from the position shown in FIG. 3, towards the position shown in FIG. 4, it will be appreciated that this movement is initiated by the force applied to the springs 41,42 by the displacement of the barrier 2, but thereafter, downward pivoting of the barrier 3 is assisted by gravity until, finally, the barrier 3 reaches the position shown in FIG. 2. At this time the chains 43,44 again become taut, thus applying a force to the barrier 2 to urge the latter into the inoperative position in which finally it engages the stop 45. The situation is similar during the reverse movement described in the preceding paragraph. It will be understood, therefore, that the barriers 2 and 3 are in a counterbalanced arrangement. The barriers 2 and 3 are constructed so that their respective centres of gravity are located in suitable positions for the desired counterbalancing effect to be achieved.

It will be noted that during the movement of the barriers 2 and 3 in each direction, the springs 41,42 provide a lost-motion connection between the barriers. The chains 43,44 constitute deformable connecting means which are capable of providing a force-transmitting connection between the barriers 2 and 3 when required, but which are deformable to allow relative movement of the barriers when necessary.

In some cases it might, of course, be sufficient to employ a single spring 41 or 42 and a single chain 43 or 44, a cord or cords could be employed instead of chains.

It will be understood that the above description of one form of gate constructed in accordance with the invention is given by way of example only and that the details thereof can be modified without departing from the scope of the invention, as defined by the appended claims.

I claim:

1. In an animal stall having two walls forming between them a relatively narrow entrance for the passage of animals into and out of the stall, a gate assembly which comprises inner and outer barrier elements movably mounted one behind the other adjacent said entrance, each barrier element being movable between an operative position in which it extends in said entrance and an inoperative displaced position, and means interconnecting said barrier elements and providing a lost-motion connection between them, whereby one of said barrier elements is caused to move towards its operative position when the other moves towards its inoperative position and vice versa, while allowing limited angular displacement of said barrier elements relatively to one another during such movement.

2. A gate assembly according to claim 1, wherein said interconnecting means is effective to allow said inner barrier element, when in its operative position, to be normally free for displacement towards its inoperative position, by an animal attempting to enter said stall, so as to admit the animal to the stall, said assembly further comprising means to prevent said outer barrier element from being displaced when in its operative position, by an animal attempting to enter said stall, so that it bars the way to such animal.

3. A gate assembly according to claim 1, wherein said interconnecting means connects said barrier elements for counter-balancing movement, such that each said barrier element, during movement towards its operative position, applies a force to the other said barrier element to assist the latter in its movement towards its inoperative position.

4. A gate assembly according to claim 1, wherein said barrier elements are pivotably connected for movement relatively to one another, about a common pivotal axis.

5. A gate assembly according to claim 1, wherein each said barrier element is pivotable between its operative and inoperative positions about a horizontal axis, and wherein said interconnecting means serves to interconnect said barrier elements for counter-balanced movement, such that each barrier element is gravity-assisted in its movement towards its operative position while said interconnecting means is effective, under the action of gravity-assisted movement of one said barrier element, to apply a force to the other said barrier element, to assist the latter in its movement towards its inoperative position.

6. A gate assembly according to claim 5, wherein said interconnecting means include a deformable connection interconnecting said barrier elements, said deformable connection being capable of transmitting force between said barrier elements, but being deformable to allow movement of said barrier elements relatively to one another.

7. A gate assembly according to claim 6, wherein spring means are provided, biassing said barrier elements towards relative positions in which said deformable connection is capable of transmitting force between said barrier elements.

* * * * *